US005402180A

United States Patent [19]
Jung

[11] Patent Number: 5,402,180
[45] Date of Patent: Mar. 28, 1995

[54] RGB ENCODER FOR PRODUCING A COMPOSITE VIDEO SIGNAL FOR NTSC AND PAL SYSTEMS

[75] Inventor: Soon-gil Jung, Kyungki, Rep. of Korea

[73] Assignee: Samsung Electronics Co., Ltd., Kyungki, Rep. of Korea

[21] Appl. No.: 187,545

[22] Filed: Jan. 28, 1994

[30] Foreign Application Priority Data

Jan. 28, 1993 [KR] Rep. of Korea ............ 93-1051

[51] Int. Cl.$^6$ ............................................. H04N 9/65
[52] U.S. Cl. ................................... 348/642; 348/707
[58] Field of Search ............ 348/642, 618, 707, 724, 348/488; 358/23; H04N 9/65; 330/303, 306, 280

[56] References Cited

U.S. PATENT DOCUMENTS

| | | | |
|---|---|---|---|
| 4,255,758 | 3/1981 | Aschwanden | 348/642 |
| 4,982,179 | 1/1991 | Ogawa | 348/642 |
| 5,317,216 | 5/1994 | Hosoya | 330/306 |

FOREIGN PATENT DOCUMENTS 63-198497  8/1988  Japan .

*Primary Examiner*—James J. Groody
*Assistant Examiner*—Sherrie Hsia
*Attorney, Agent, or Firm*—Sughrue, Mion, Zinn, Macpeak & Seas

[57] ABSTRACT

An RGB encoder includes a Y-matrix processor, a chrominance signal processor, a bandpass filter, a delay element, an OTA (operational transconductance amplifier) control signal generator and a mixer. The OTA bandpass filter has a plurality of operational transconductance amplifiers for bandpass-filtering the chrominance signal, wherein the passband is varied according to the transconductance of the operational transconductance amplifiers included therein. The OTA delay element has a plurality of operational transconductance amplifiers for receiving and delaying the luminance signal, wherein the delay time is varied according to the transconductance of the operational transconductance amplifiers included therein. The OTA control signal generator generates first and second control signals in accordance with an NTSC/PAL select signal. The first control signal controls the transconductance of the operational transconductance amplifiers included in the OTA bandpass filter and the second control signal controls the transconductance of the operational transconductance amplifiers included in the OTA delay element. The mixer mixes the outputs of the bandpass filter and delay element, in order to produce a composite video signal. The RGB encoder has lower manufacturing costs and reduced power consumption.

10 Claims, 8 Drawing Sheets

RGB ENCODER FOR PRODUCING A COMPOSITE VIDEO SIGNAL FOR NTSC AND PAL SYSTEMS

BACKGROUND OF THE INVENTION

The present invention relates to an RGB encoder which receives a primary color video signal (that is, an RGB signal) and a composite synchronizing signal so as to produce a composite video signal, and more particularly, to an RGB encoder whose operation mode can be switched between the National Television System Committee (NTSC) system and the phase alternating line (PAL) system, in accordance with an NTSC/PAL select signal.

FIG. 1 is a schematic block diagram of a conventional RGB encoder for combined NTSC/PAL systems, which includes a Y-matrix processor 101, an R-Y processor 102, a B-Y processor 103, a burst-gate-pulse (BGP) generator 104, a sync separator 105, an R-Y signal modulator 106, a B-Y signal modulator 107, a phase shifter 108, an NTSC/PAL selector 109, an oscillator 110, an adder 111, a chroma buffer 112, a bandpass filter (BPF) 113, a sync adder 114, a delay element 115 and a mixer 116.

Referring to FIG. 1, Y-matrix processor 101 mixes the primary color signal which constitutes R, G, and B (red, green, and blue) signals produced from an electronic device such as camera tube, microcomputer, etc., in specific proportions, so as to produce a luminance signal (Y). Here, the mixing ratio of the R, G and B signals is controlled by controlling the ratios of the resistances of resistors which are connected to the respective RGB input terminals. The thus-produced luminance signal is summed with composite sync (Csync) pulses in sync adder 114. Sync separator 105 separates horizontal synchronizing pulses from the received composite sync pulses and then applies the separated horizontal synchronizing pulses to BGP generator 104. A burst-gate pulse is active during the transmission of the color burst signal in the composite video signals, that is, it is active during a predetermined time (about 0.5 $\mu$s after the horizontal synchronizing pulse). R-Y processor 102 subtracts the luminance signal produced in Y-matrix processor 101 from the R signal of the received RGB signal, so as to produce a first color difference signal (R-Y), and B-Y processor 103 subtracts the luminance signal from the B signal, so as to produce a second color difference signal (B-Y). Then, the R-Y and B-Y color difference signals are respectively modulated in R-Y modulator 106 and B-Y modulator 107. The carrier used in R-Y modulator 106 and B-Y modulator 107 is produced in oscillator 110 and then phase-shifted in phase shifter 108, in accordance with the NTSC/PAL select signal. First, for an NTSC system, the carrier used in R-Y signal modulator 106 has a 90° phase difference with respect to that used in B-Y modulator 107. For PAL systems, the carriers used in R-Y modulator 106 also has a 90° phase difference with respect to that used in B-Y signal modulator 107 but the carder used in R-Y modulator 106 is phase-shifted by 180° every other horizontal scanning line. Accordingly, phase shifter 108 receives the signal produced from oscillator 110 and then, for NTSC systems, outputs the received signal and one phase-shifted by 90°, and for PAL systems, outputs the received signal and a signal which is phase-shifted by 90° and 270° alternately, every other horizontal scanning line. The modulated outputs of R-Y modulator 106 and B-Y modulator 107 are summed in adder 111 to produce a chrominance signal which is then applied to bandpass filter 113 via chroma buffer 112. Bandpass filter 113 removes the noise included in the chrominance signal applied via chroma buffer 112. The chrominance signal has an approximately 1 MHz bandwidth and its center frequency is the same as that of the color subcarrier. Bandpass filter 113 passes only the components of this frequency band, i.e., that of the chrominance signal, thereby attenuating the noise outside the passband. Here, the center frequency of the color subcarrier is about 3.58 MHz for NTSC systems and about 4.43 MHz for PAL systems. The conventional bandpass filter will be explained later referring to FIG. 2. Delay element 115 compensates for the time delay difference between the signal processing of the luminance signal and that of the chrominance signal. Here, the time delay of an NTSC system is different from that of a PAL system. Mixer 116 mixes the luminance signal applied from delay element 115 with the chrominance signal applied from bandpass filter 113, so as to produce a composite video signal.

In the conventional RGB encoder for combined NTSC/PAL systems constructed as above, the operation of delay element 115 and bandpass filter 113 in an NTSC mode should differ from that in a PAL mode. There are two conventional methods to accomplish this. In one conventional method, the delay element and the bandpass filter are both formed of discrete components, such that time constants of these circuits can be controlled. However, an RGB encoder having the discrete-circuit-type delay element and bandpass filter complicates the application circuit thereof, so as to be undesirable.

In the other conventional method, as shown in FIG. 2, two delay elements and two bandpass filters are formed separately: one delay element and one bandpass filter for the NTSC system and one delay element and one bandpass filter for PAL system, with only one pair being enabled in accordance with the NTSC/PAL select signal. Two delay elements and two bandpass filters can be integrated in a semiconductor circuit chip but the overall circuit structure thereof is very complicated due to critical circuit design requirements, which results in increased manufacturing cost. Also, power consumption is high when using such a structure.

SUMMARY OF THE INVENTION

Therefore, the object of the present invention is to provide an RGB encoder which can be integrated in a semiconductor chip and whose operational mode can be switched between that for an NTSC system and that for a PAL system, in accordance with a NTSC/PAL select signal.

To achieve the object of the present invention, there is provided an RGB encoder which selectively encodes an RGB video signal into an NTSC system composite video signal or a PAL system composite video signal in accordance with an NTSC/PAL select signal, using a composite sync pulse input, the encoder comprising:

means for operating the RGB video signal and the composite sync pulse input to produce a luminance signal incorporated into the composite sync pulses;

means for operating the RGB video signal to produce a chrominance signal;

an operational transconductance amplifier (OTA) bandpass filter having a plurality of operational transconductance amplifiers, for bandpass-filtering the chrominance signal, wherein the passband is varied by varying the transconductance of the operational transconductance amplifiers included therein;

an OTA delay element having a plurality of operational transconductance amplifiers, for receiving the luminance signal and delaying the received luminance signal to produce a delayed luminance signal, wherein the delay time is varied by varying the transconductance of the operational transconductance amplifiers included therein;

a control signal generator for generating a first control signal and a second control signal in accordance with the NTSC/PAL select signal, wherein the first control signal controls the transconductance of the operational transconductance amplifiers included in the OTA bandpass filter and the second control signal controls the transconductance of the operational transconductance amplifiers included in the OTA delay element; and means for mixing the output of the OTA bandpass filter and the output of the OTA delay element, so as to produce a composite video signal.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
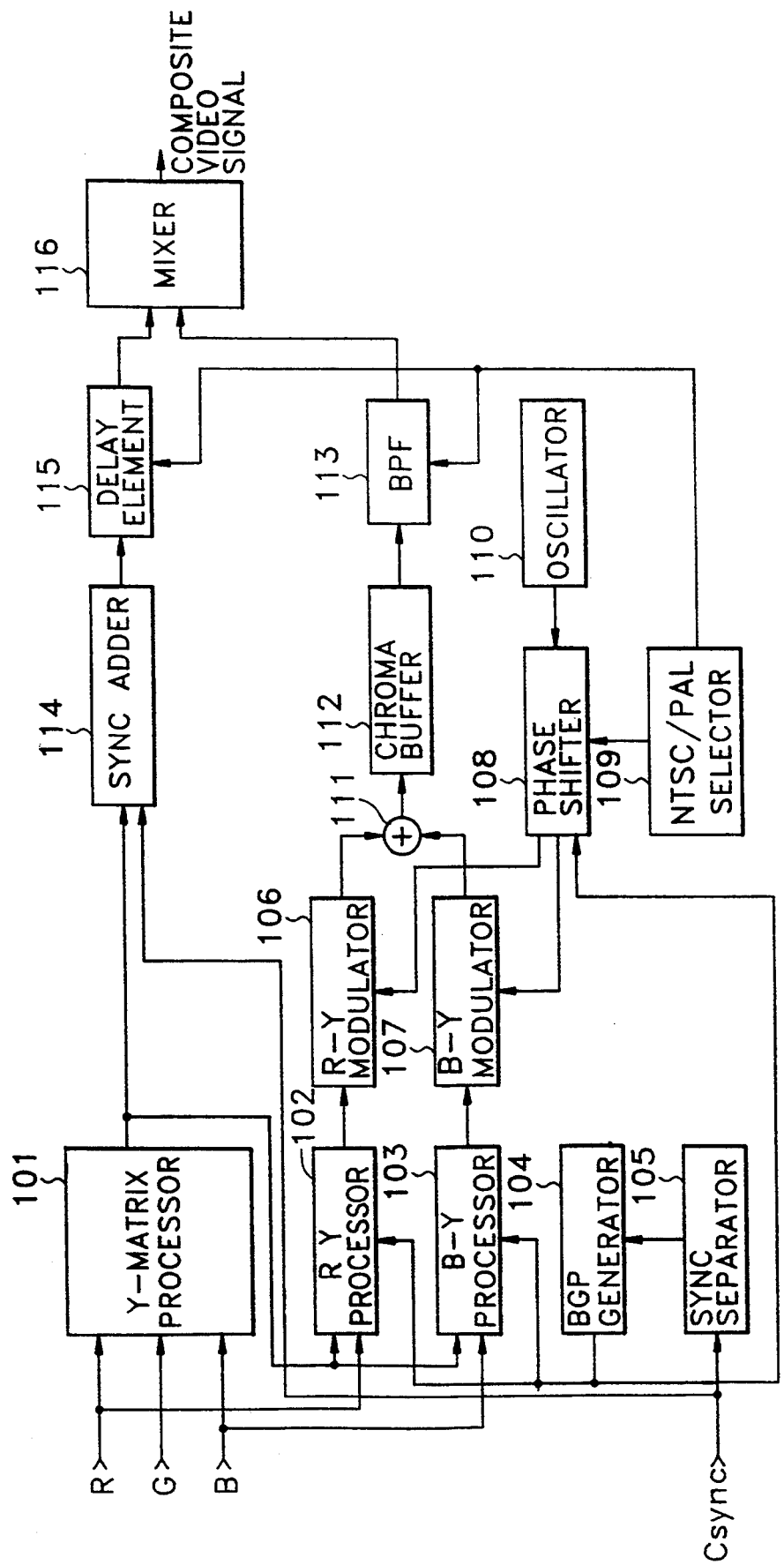
FIG. 1 is a schematic block diagram of a conventional RGB encoder which can be switched between NTSC and PAL modes.
Figure 2:
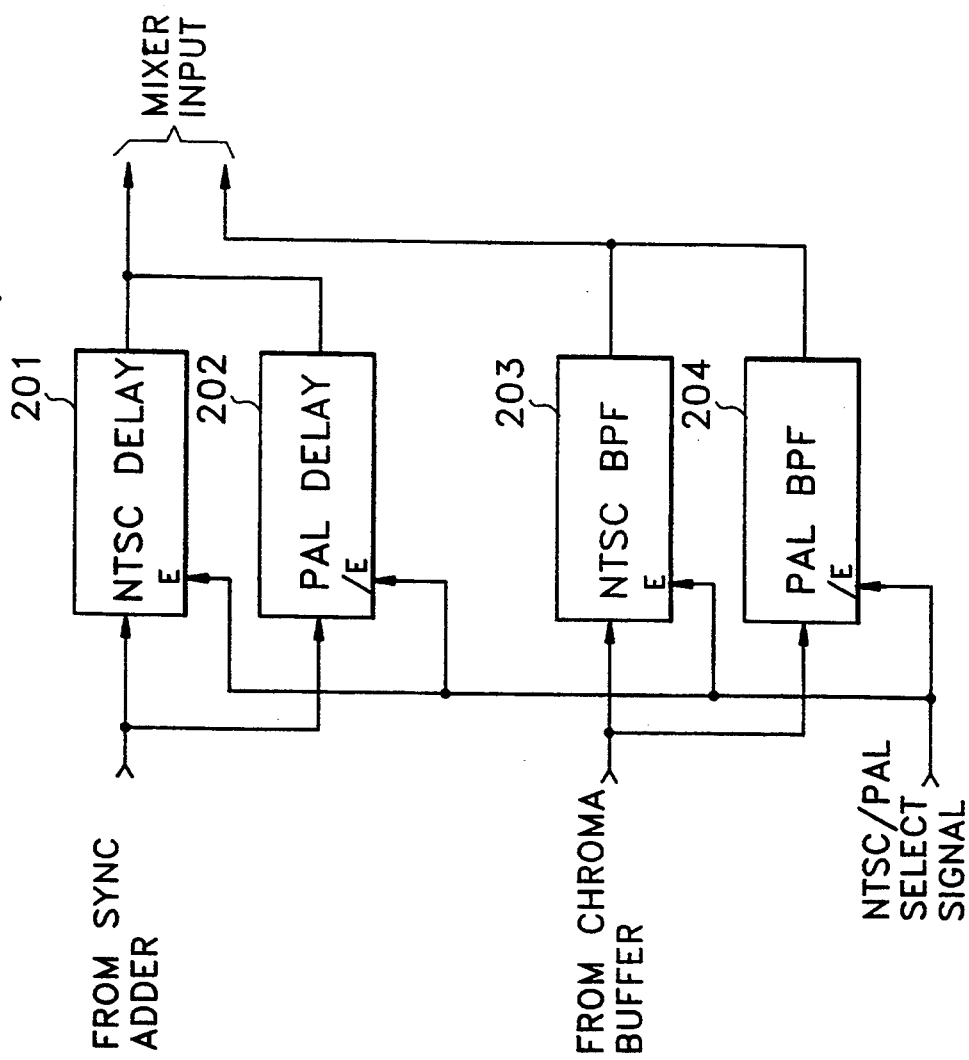
FIG. 2 illustrates a structure for separate delay elements and bandpass filters for the RGB encoder of FIG. 1.
Figure 3:
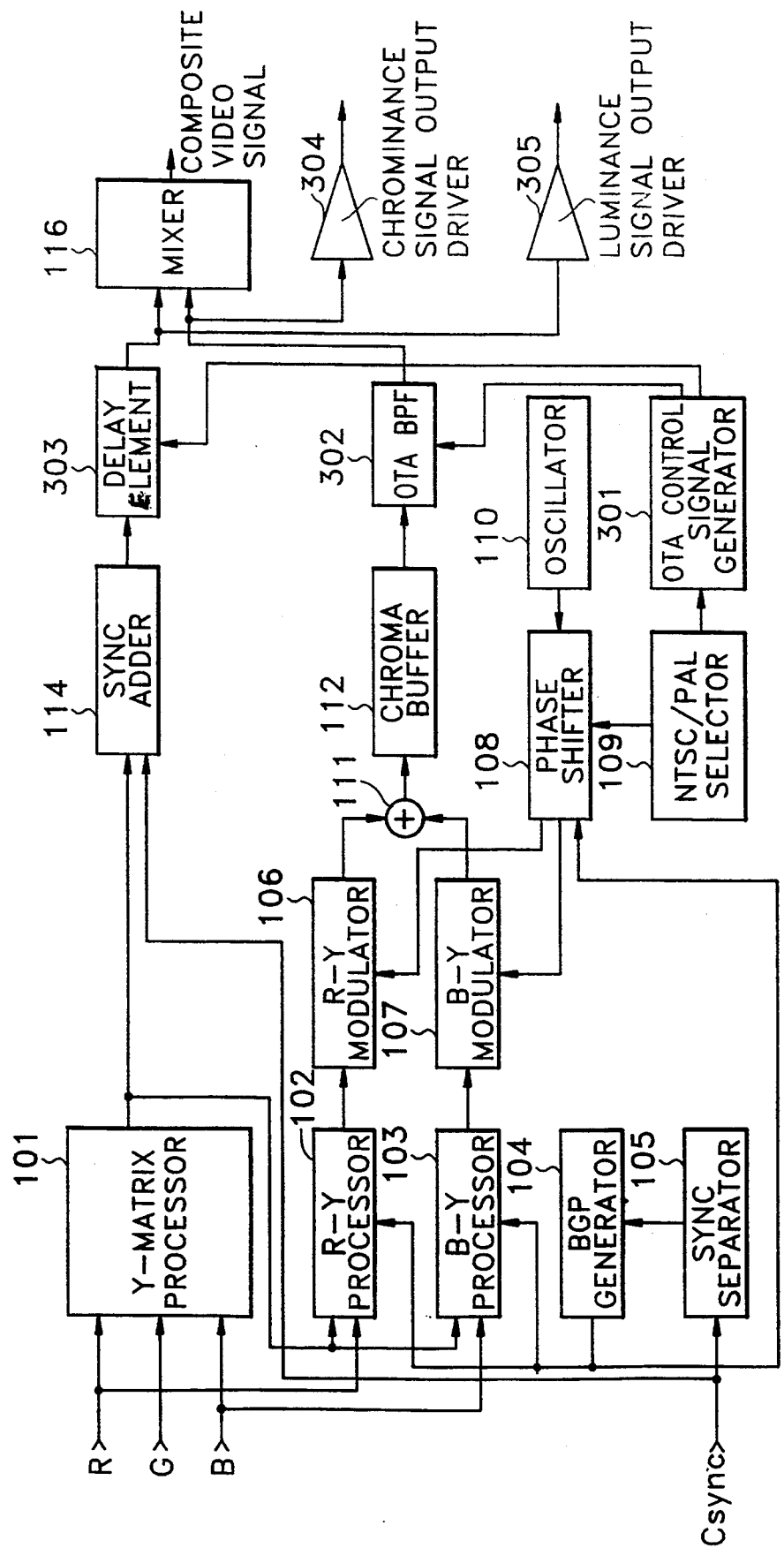
FIG. 3 is a schematic block diagram of an RGB encoder according to the present invention, which can be switched between NTSC and PAL modes.

FIG. 3 is a block diagram of an RGB encoder whose operation mode is switched between the NTSC system and the PAL system, according to the present invention. Those elements which are the same in FIG. 3 as in FIG. 1 are designated by the same numerals. As compared with FIG. 1, the RGB encoder includes an OTA delay element 303 replacing delay element 115 and an OTA bandpass filter 302 replacing bandpass filter 113, and further includes an OTA control signal generator 301 which produces an OTA control signal to be applied to the OTA delay element and the OTA bandpass filter. The RGB encoder according to the present invention also includes a chrominance signal output driver 304 which receives the output of OTA bandpass filter 302 so as to provide the chrominance signal externally, and a luminance signal output driver 305 which receives the output of OTA delay element 303 so as to provide the luminance signal externally. These drivers are merely for convenience in video signal processing and are used to obtain a high-definition video signal in which the chrominance signal and the luminance signal are processed separately. Thus, the RGB encoder according to the present invention has the advantage of adapting to high-quality video signal processing devices.

In FIG. 3, OTA delay element 303 and OTA bandpass filter 302 each comprise OTA amplifiers whose transconductance is controlled by first and second control signals, respectively. The first and second control signals are applied from OTA control signal generator 301. Therefore, the delay time of OTA delay element 303 can be controlled by the first control signal and the passband of OTA bandpass filter can be controlled by the second control signal.

Figure 4B:
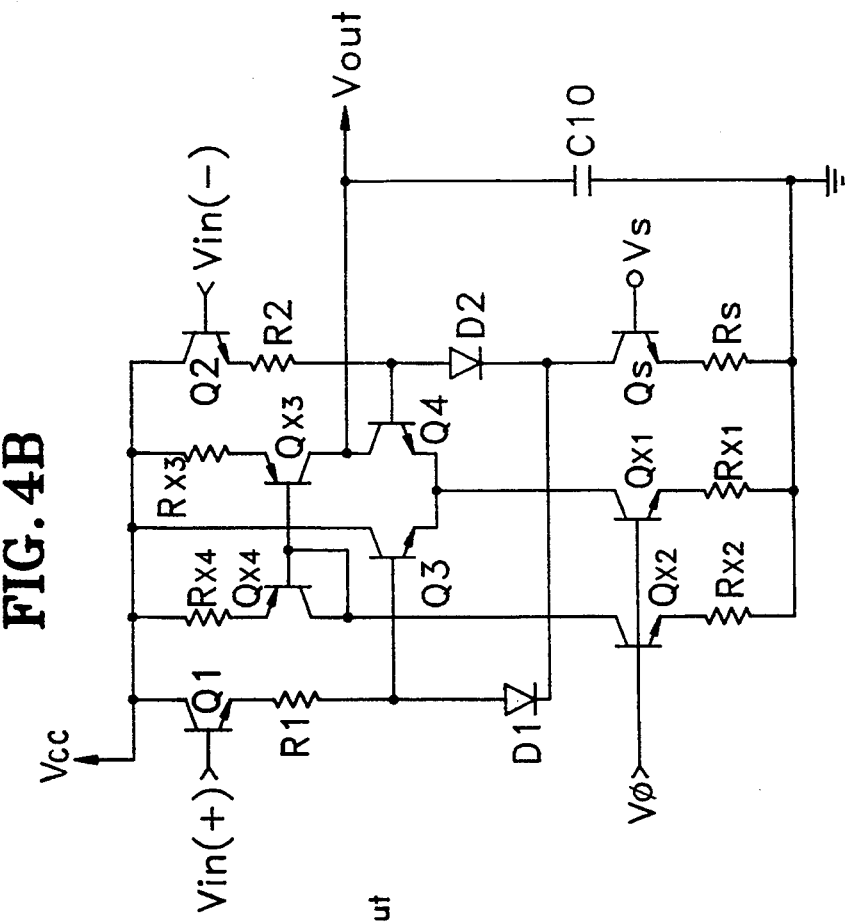
FIG. 4A and 4B are circuit diagrams for illustrating an embodiment of an operational transconductance amplifier (OTA)
Figure 4A:
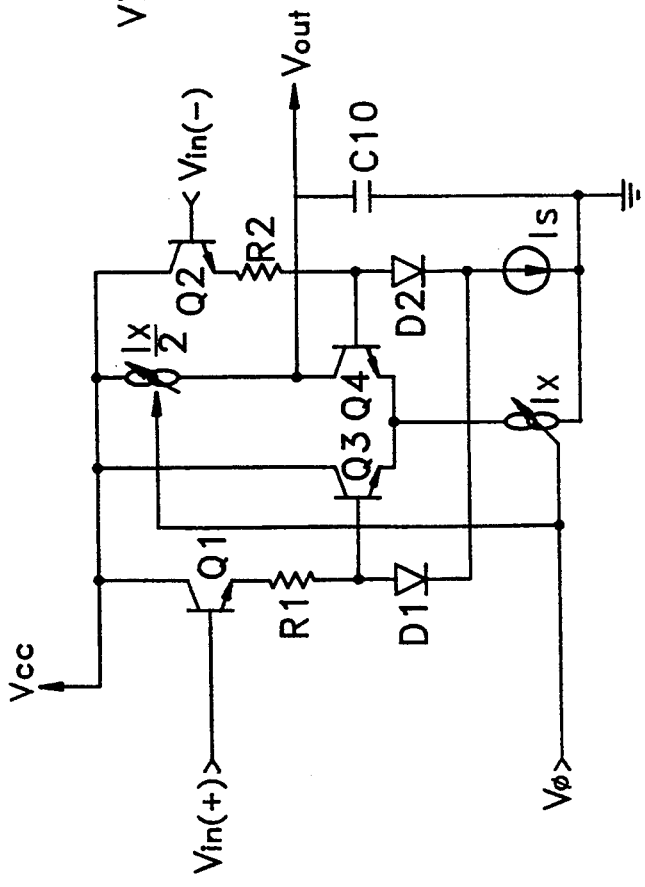

FIG. 4A is a circuit diagram of a conventional OTA amplifier, and FIG. 4B is a circuit diagram detailing certain elements of FIG. 4A.

In FIG. 4A, transistors Q1, Q2, Q3 and Q4, resistors R1 and R2 and diodes D1 and D2 constitute a basic differential amplifier circuit. Here, a constant-current circuit Is provides biasing. On the other hand, the current of a first dependent current source Ix connected between the common emitter node of the differential amplifier circuit and ground, varies depending on an OTA control signal V$\phi$. OTA control signal V100 is also supplied to a second dependent current source Ix/2 connected between Vcc and the output node (Vout). Here, the amount of current flowing through second dependent current source Ix/2 is half of that through first dependent current source Ix.

FIG. 4B shows in more detail the embodiment of the basic differential amplifier circuit which includes constant-current circuit Is, first dependent current source Ix and second dependent current source Ix/2, as shown in FIG. 4A, wherein these elements are implemented using transistor-based structures suitable for an integrated circuit. In FIG. 4B, constant current circuit Is is constituted by a transistor Qs and a resistor Rs, and a first dependent current source Ix is constituted by a transistors Qx1 and Qx2 and resistors Rx1 and Rx2. The second dependent current source Ix/2 is constituted by a transistor Qx3, a diode Qx4 and resistors Rx3 and Rx4. Given that the resistance of resistor R1 is equal to that of resistor R2, the transconductance $g_m$ of the OTA formed as shown in FIG. 4A or 4B is represented as the following equation (1).

$$g_m \approx \frac{1}{2R_1} \times \frac{I_x}{I_s} \qquad (1)$$

Figure 5:
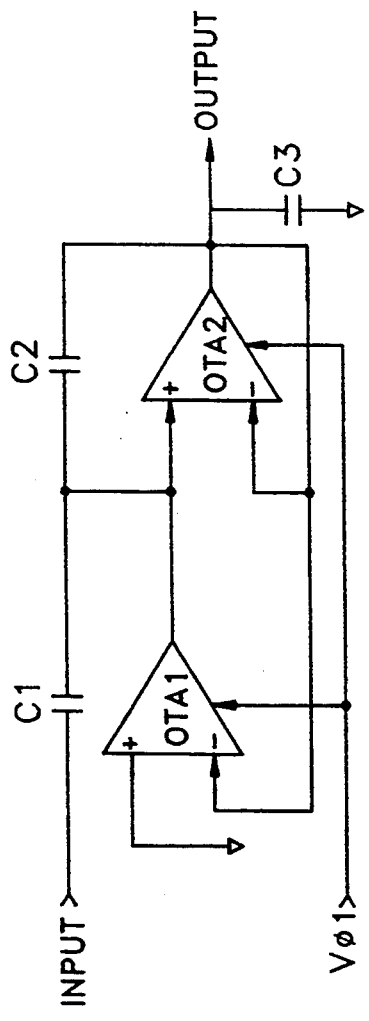
FIG. 5 is a circuit diagram of the OTA bandpass filter in FIG. 3, according to one embodiment of the present invention.

FIG. 5 shows the structure of the OTA bandpass filter as shown in FIG. 3, according to one embodiment of the invention. The OTA bandpass filter includes a first capacitor C1, a second capacitor C2, a third capacitor C3, a first operational transconductance amplifier OTA1, and a second operational transconductance amplifier OTA2.

In FIG. 5, the first input node Vin(+) of first operational transconductance amplifier OTA1 is connected to ground and the second input node Vin(−) receives the feedback signal from the output node of second operational transconductance amplifier OTA2. One end of first capacitor C1 is connected to the input node of the OTA bandpass filter and the other end thereof is connected to the output of first operational transconductance amplifier OTA1. The output of first operational transconductance amplifier OTA1 is commonly connected to one end of second capacitor C2 and the first input node Vin(+) of second operational transconductance amplifier OTA2. The second input node Vin(−) of second operational transconductance amplifier OTA2 is connected to the output node of the OTA bandpass filter and to the other end of second capacitor C2. Third capacitor C3 has one end connected to the output of the OTA bandpass filter and the other end connected to ground. First operational transconductance amplifier OTA1 can be formed as shown in FIG. 4A or 4B, where a first control signal $V\phi 1$ is applied to first operational transconductance amplifier OTA1 as OTA control signal $V\phi$.

In first and second operational transconductance amplifiers OTA1 and OTA2, if the transconductance of first operational transconductance amplifier OTA1 is denoted as $g_{m1}$ and the transconductance of second operational transconductance amplifier OTA2 is denoted as $g_{m2}$, the transfer function of the OTA bandpass filter is represented as the following equation (2).

$$\frac{V_o(s)}{V_i(s)} = \frac{s\left(\frac{C_1 g_{m2}}{C_3(C_1 + C_2)}\right)}{s^2 + s\left(\frac{C_1 g_{m2}}{C_3(C_1 + C_2)}\right) + \frac{g_{m1} g_{m2}}{C_3(C_1 + C_2)}} \quad (2)$$

Based on the equation (2), a resonance frequency $\omega_0$ and a quality factor Q can be represented as the following equations (3) and (4), respectively.

$$\omega_0 = \sqrt{\frac{g_{m1} g_{m2}}{C_3(C_1 + C_2)}} \quad (3)$$

$$Q = \sqrt{\frac{g_{m1}}{g_{m2}}\left(\frac{C_3(C_1 + C_2)}{C_1^2}\right)} \quad (4)$$

As described above, in the OTA bandpass filter according to the present invention, the resonance frequency $\omega_0$ varies in accordance with variation of the OTA transconductance values. The quality factor Q varies only a small amount because, as first control signal $V\phi 1$ is varied, transconductance values $g_{m1}$ and $g_{m2}$ change but maintain a constant ratio.

Figure 6:
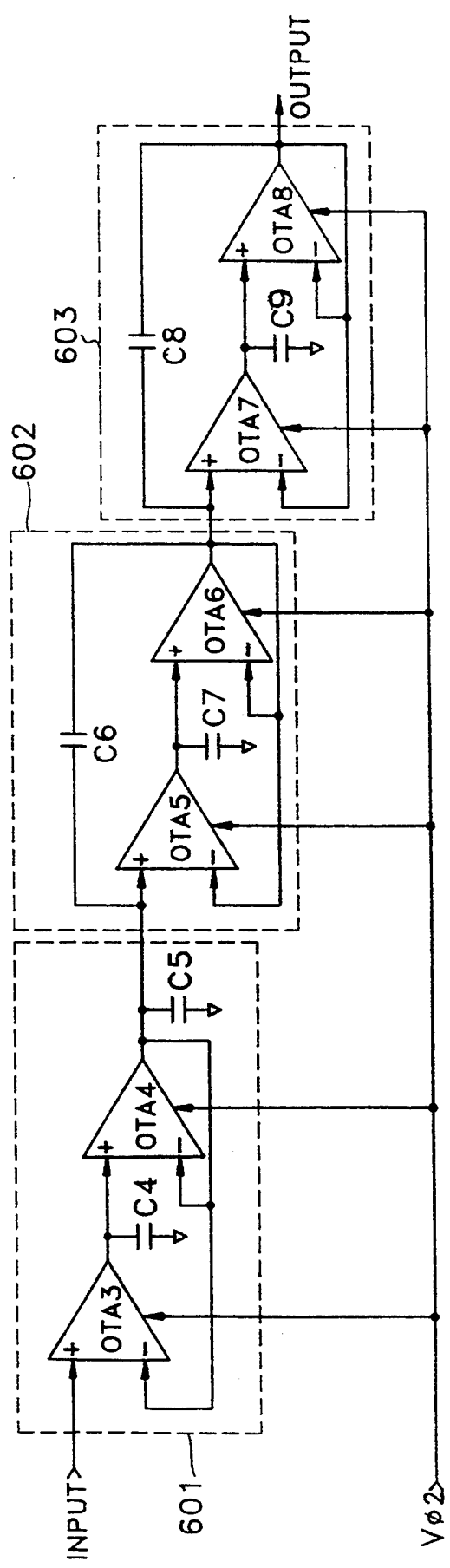
FIG. 6 is a circuit diagram of the OTA delay element in FIG. 3, according to one embodiment of the present invention.

FIG. 6 shows the structure of OTA delay element 303 shown in FIG. 3, according to one embodiment of the invention. Here, the OTA delay element includes a low-pass filter 601, a first trap filter 602 and a second trap filter 603.

Referring to FIG. 6, first low-pass filter 601 comprises a third operational transconductance amplifier OTA3, a fourth operational transconductance amplifier OTA4, a fourth capacitor C4 and a fifth capacitor C5. The first input node Vin(+) of third operational transconductance amplifier OTA3 corresponds to the OTA delay element input node which is connected to the output of sync adder 114 (FIG. 3) so as to receive the luminance signal with sync signal. Meanwhile, the second input node Vin(−) of third operational transconductance amplifier OTA3 is connected to the output node of fourth operational transconductance amplifier OTA4. In order to remove high-frequency noise, fourth capacitor C4 is connected between the output node of third operational transconductance amplifier OTA3 and ground and fifth capacitor C5 is connected between the output node of fourth operational transconductance amplifier OTA4 and ground. Here, a second control signal $V\phi 2$ is applied to both third and fourth operational transconductance amplifiers OTA3 and OTA4, in order to control their transconductance values.

First trap filter 602 and second trap filter 603 have identical structures, whereby the bandwidths of the respective rejection bands are varied in accordance with the capacitances of the capacitors and the resistances of the resistors.

First trap filter 602 includes a fifth operational transconductance amplifier OTA5, a sixth operational transconductance amplifier OTA6, a sixth capacitor C6 and a seventh capacitor C7. In first trap filter 602 of FIG. 6, first input node Vin(+) of fifth operational transconductance amplifier OTA5 is connected to the output of the low-pass filter 601, and second input node Vin(−) of fifth operational transconductance amplifier OTA5 is connected to the output node of sixth operational transconductance amplifier OTA6. Seventh capacitor C7 is connected between the output node of fifth operational transconductance amplifier OTA5 and ground, so as to remove high-frequency noise. The first input node Vin(+) of sixth operational transconductance amplifier OTA6 is connected to the output node of fifth operational transconductance amplifier OTA5, and second input node Vin(−) of sixth operational transconductance amplifier OTA6 is connected to the output node thereof. Sixth capacitor C6 is connected between the first input node Vin(+) of fifth operational transconductance amplifier OTA5 and the output node of sixth operational transconductance amplifier OTA6, thus serving as a feedback path.

Here, first trap filter 602 and second trap filter 603 eliminate the chrominance signal component from the luminance signal. In more detail, first trap filter 602 removes the 3.58 MHz noise corresponding to the chrominance signal of an NTSC system, while second trap filter 603 removes the 4.43 MHz noise corresponding to the chrominance signal of a PAL system.

Figure 7:
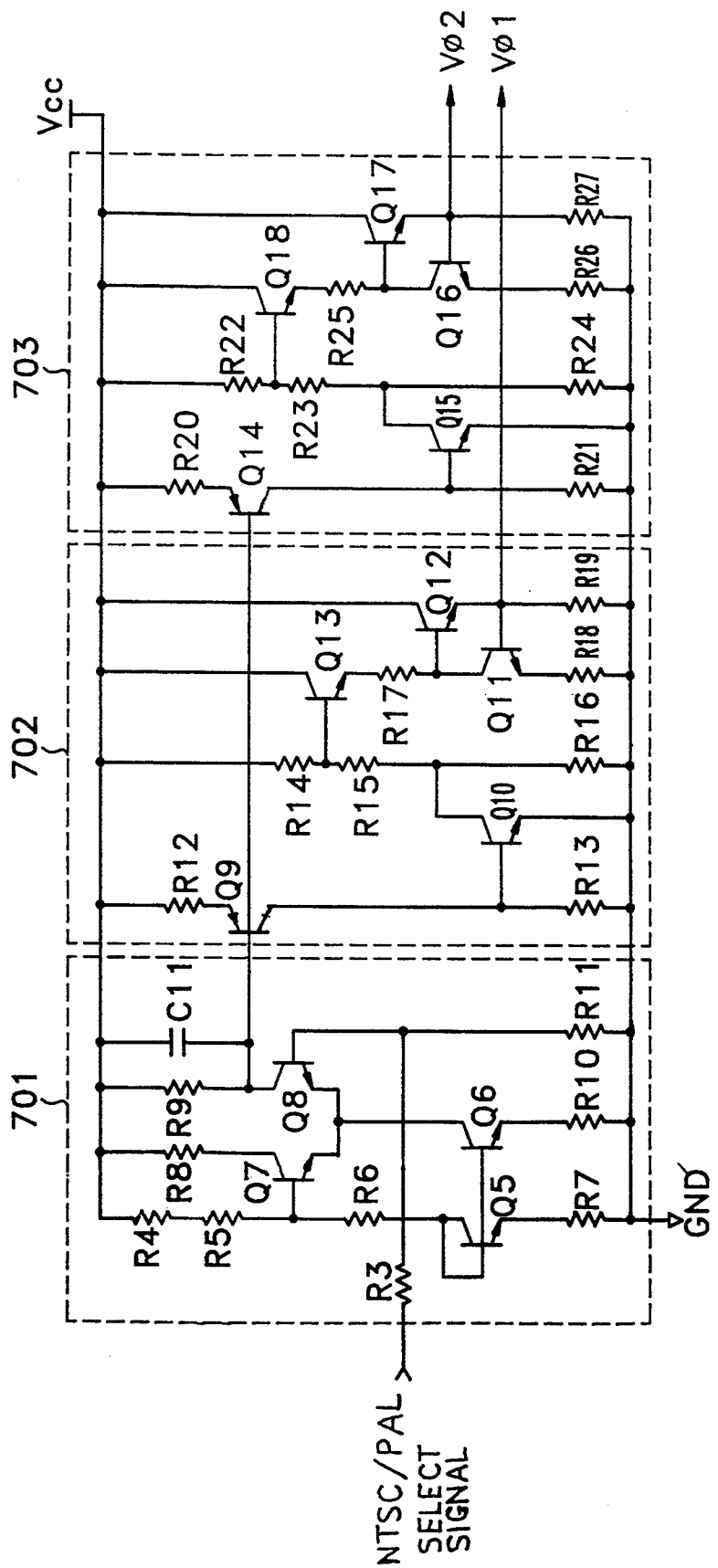
FIG. 7 is a circuit diagram of the OTA control signal generator shown in FIG. 3, according to one embodiment of the present invention.

FIG. 7 is a circuit diagram of the OTA control signal generator of FIG. 3, according to one embodiment of the invention. The OTA control signal generator includes a signal buffer 701, a first level selector 702 and a second level selector 703.

In FIG. 7, signal buffer 701 compares the NTSC/PAL select signal which is applied from NTSC/PAL selector 109 with a predetermined reference signal, in order to produce a modulated NTSC/PAL select signal. Here, the reference signal corresponds to the voltage of the base of a transistor Q7. The NTSC/PAL select signal is applied to the base of a transistor Q8. An eleventh capacitor C 11 removes any high-frequency noise which may be generated in accordance with the abrupt change of the NTSC/PAL select signal. A transistor Q5 and a transistor Q6 together serve as the bias current source.

First level selector 702 and second level selector 703 produce the first control signal $V\phi1$ and the second control signal $V\phi2$, respectively. The voltage of first control signal $V\phi1$ is one selected between a pair of predetermined voltages in accordance with the modulated NTSC/PAL select signal, and the voltage of second control signal $V\phi2$ is one selected between another pair of predetermined voltages in accordance with the modulated NTSC/PAL select signal.

The following is a more detailed description of the OTA control signal generator 301. First, when the NTSC/PAL select signal indicates the selection of an NTSC mode, that is, the NTSC/PAL select signal is high (for example, +5 volts), transistor Q8 of signal buffer 701 turns on while transistor Q7 thereof turns off. According to the operation of transistors Q8 and Q7, transistors Q9 and 10 and transistors Q14 and Q15 turn on. Consequently, supposing that the collector-to-emitter voltage of transistor Q10 (in saturation) is $V_{CE10}(sat)$ and a supply voltage is Vcc, the voltage applied to the base of a transistor Q13 is described as follows.

$$V_{B13} = (V_{CC} - V_{CE10sat}) \times \frac{R_{15}}{R_{14} + R_{15}} + V_{CE10sat}$$

In the same way, the voltage of the base of a transistor Q18 is:

$$V_{B18} = (V_{CC} - V_{CE15sat}) \times \frac{R_{23}}{R_{22} + R_{23}} + V_{CE15sat}$$

On the other hand, when the PAL system is selected, that is, the NTSC/PAL select signal is low (for example, 0 volts), transistor Q8 turns off and transistor Q7 turns on. Thus, transistors Q9 and Q10 and transistors Q14 and Q15 turn off. As a consequence, the voltage served at the base of a transistor Q13 is shown in the following equation.

$$V_{B13} = V_{CC} \times \frac{R_{15} + R_{16}}{R_{14} + R_{15} + R_{16}}$$

Also, in the same way, the voltage of the base of a transistor Q18 is determined.

$$V_{B18} = V_{CC} \times \frac{R_{23} + R_{24}}{R_{22} + R_{23} + R_{24}}$$

First control signal $V\phi1$ and second control signal $V\phi2$ are represented as the following equations.

$$V_{\phi1} = R_{18} \left( \frac{V_{B13} - V_{BE13(ON)} - V_{BE12(ON)} - V_{BE11(ON)}}{R_{17} + R_{18}} \right) + V_{BE11(ON)}$$

$$V_{\phi2} = R_{26} \left( \frac{V_{B18} - V_{BE18(ON)} - V_{BE17(ON)} - V_{BE16(ON)}}{R_{25} + R_{26}} \right) + V_{BE16(ON)}$$

Here, VB13 represents the voltage of the base of transistor Q13, $V_{BE13(ON)}$ represents the base-emitter voltage of transistor Q13 when turned on, $V_{BE12(ON)}$ and VBE11(ON) represent the base-emitter voltages of transistors Q12 and Q11 when turned on, respectively, VB18 represents the voltage at the base of transistor Q18, $V_{BE18(ON)}$ represents the base-emitter voltage of transistor Q18 when turned on, and $V_{BE17(ON)}$ and $V_{BE16(ON)}$ represent the base-emitter voltages of transistors Q17 and Q16 when turned on, respectively.

In first and second level selectors 702 and 703, because the voltages served to the bases of transistor Q13 and transistor Q18 vary in accordance with the NTSC/PAL select signal, the voltage levels of first control signal $V\phi1$ and second control signal $V\phi2$ also vary in accordance therewith.

Figure 8:
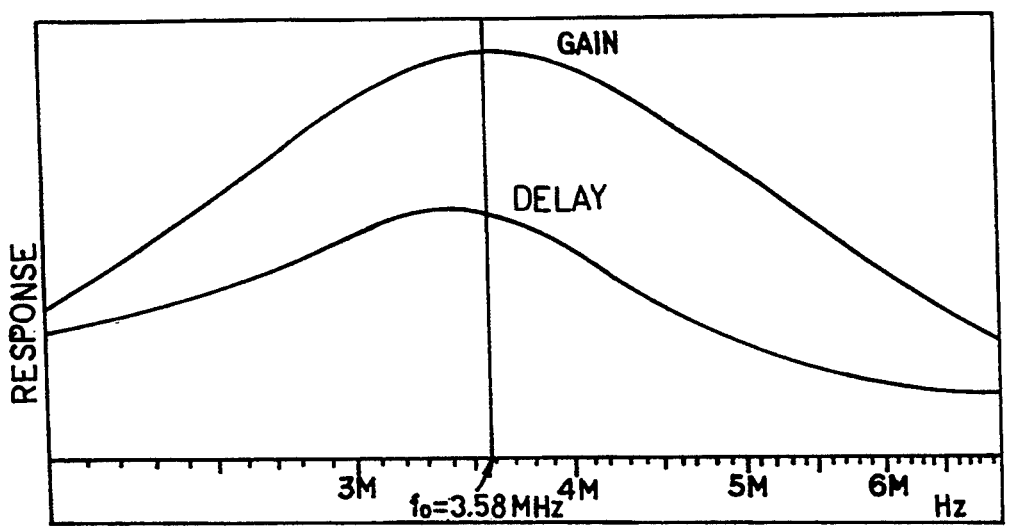
FIG. 8 is a graphical representation showing frequency characteristics of an OTA bandpass filter for the NTSC system.
Figure 9:
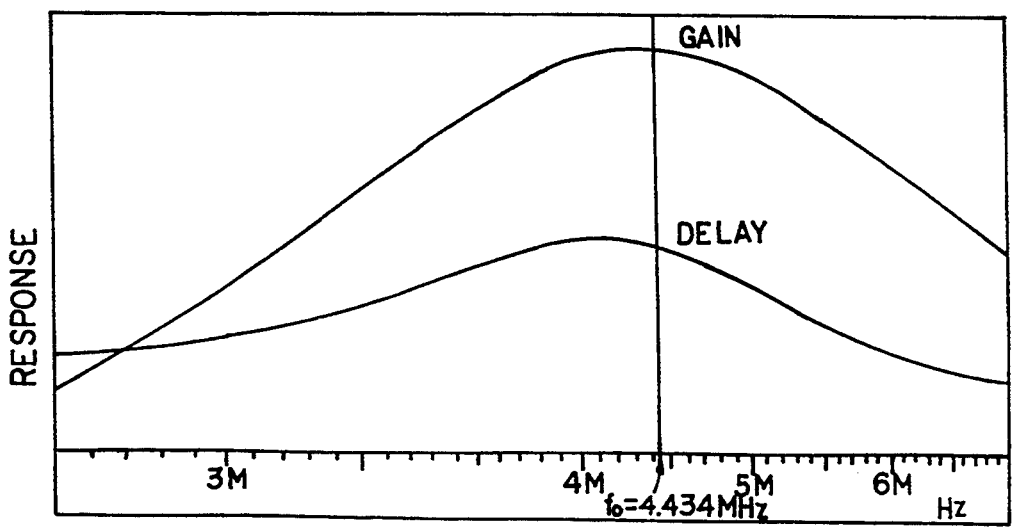
FIG. 9 is a graphical representation showing frequency characteristics of an OTA bandpass filter for the PAL system.
Figure 10:
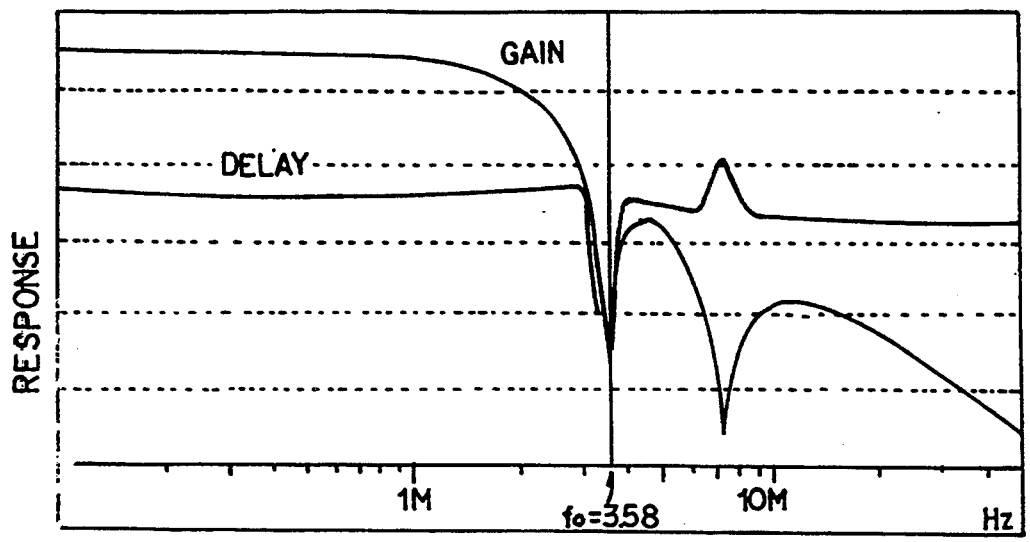
FIG. 10 is a graphical representation showing frequency characteristics of an OTA delay element for the NTSC system.
Figure 11:
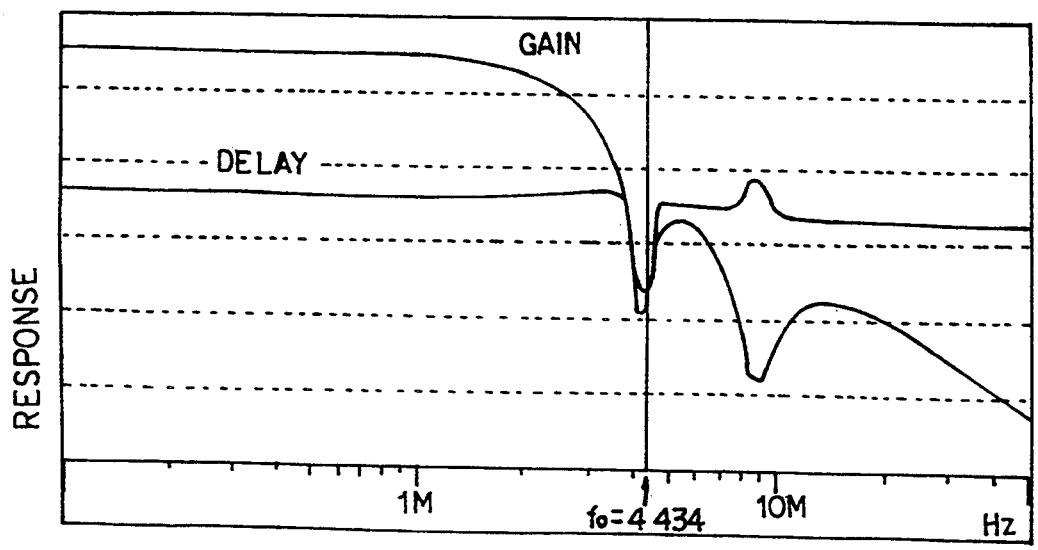
FIG. 11 is a graphical representation showing frequency characteristics of an OTA delay element for the PAL system.

FIG. 8 represents the frequency characteristics of the OTA bandpass filter for the NTSC system, while FIG. 9 represents that for the PAL system. Also, FIG. 10 represents the frequency characteristics of the OTA delay for the NTSC system, while FIG. 11 represents that for the PAL system. According to graphs of FIGS. 8 through 11, the OTA delay and the OTA bandpass filter have different resonance frequencies in accordance with the NTSC/PAL select signal, with no physical structure change.

As explained the above, the RGB encoder according to the present invention includes a delay element and bandpass filter constituted by operational transconductance amplifiers, and an OTA control signal generator producing OTA control signals. The voltage levels of the OTA control signals vary depending on the NTSC/PAL select signal. The RGB encoder also includes a chrominance signal output driver and a luminance signal output driver, so as to be easily adapted to high-definition video signal processors. The RGB encoder can be implemented by a semiconductor chip, which results in reducing manufacturing cost. Also, power consumption is lower than the conventional RGB encoder.

It will be apparent that many modifications and variations could be effected by one skilled in the art without departing from the spirit or scope of the present invention, which is to be determined by the appended claims.

What is claimed is:

1. An RGB encoder which selectively encodes an RGB video signal into an NTSC system composite video signal or a PAL system composite video signal in accordance with an NTSC/PAL select signal, using a composite sync pulse input containing composite sync pulses, the encoder comprising:
    means for processing said RGB video signal and said composite sync pulse input to produce a luminance signal incorporated into the composite sync pulses;
    means for processing said RGB video signal to produce a chrominance signal;
    an operational transconductance amplifier (OTA) bandpass filter having a plurality of operational transconductance amplifiers, for bandpass-filtering said chrominance signal in accordance with a passband which is varied by varying the transconductance of the operational transconductance amplifiers included therein in response to a first control signal;

an OTA delay element having a plurality of operational transconductance amplifiers, for receiving said luminance signal and delaying said received luminance signal to produce a delayed luminance signal having a delay time which is varied by varying the transconductance of the operational transconductance amplifiers included therein in response to a second control signal;

a control signal generator for generating said first control signal and said second control signal in accordance with the NTSC/PAL select signal, wherein said first control signal controls the transconductance of the operational transconductance amplifiers included in said OTA bandpass filter, and said second control signal controls the transconductance of the operational transconductance amplifiers included in said OTA delay element; and means for mixing the output of said OTA bandpass filter and the output of said OTA delay element to produce a composite video signal.

2. An RGB encoder as claimed in claim 1, further comprising:
a luminance signal output driver coupled to the output of said OTA delay element for output-driving the luminance signal; and
a chrominance signal output driver coupled to the output of said OTA bandpass filter for output-driving the chrominance signal.

3. An RGB encoder as claimed in claim 1, wherein said OTA bandpass filter comprises:
a first capacitor having one end which is the input of said OTA bandpass filter;
a second capacitor having one end coupled to the other end of said first capacitor;
a first operational transconductance amplifier having a first input node coupled to ground, a second input node, and an output node coupled to the other end of said first capacitor, and said first control signal being applied thereto to control the transconductance thereof;
a second operational transconductance amplifier having a first input node coupled to the output node of said first operational transconductance amplifier, a second input node coupled to the other end of said second capacitor, and an output node coupled to the other end of said second capacitor and said second input node of said first operational transconductance amplifier, and said first control signal being applied thereto to control the transconductance thereof; and
a third capacitor coupled between the output node of said second operational transconductance amplifier and ground.

4. An RGB encoder as claimed in claim 3, wherein each of said first and second operational transconductance amplifiers comprises:
a differential amplifier;
a first dependent current source coupled between a common emitter of said differential amplifier and ground, whose current is varied in accordance with said first control signal; and
a second dependent current source coupled between a power supply and an output node of the differential amplifier, whose current is half that of said first independent current source.

5. An RGB encoder as claimed in claim 1, wherein said delay element comprises:

a low-pass filter having an operational transconductance amplifier for performing low-pass-filtering;
a first trap filter having an operational transconductance amplifier for removing signal components having the same frequency as that of the color subcarrier of an NTSC system; and
a second trap filter having an operational transconductance amplifier for removing signal components having the same frequency as that of the color subcarrier of a PAL system,
wherein said low-pass filter and said first and second trap filters are coupled in series.

6. An RGB encoder as claimed in claim 5, wherein said low-pass filter comprises:
a first operational transconductance amplifier having a first input node for receiving said luminance signal, and having said second control signal applied thereto for controlling the transconductance thereof;
a second operational transconductance amplifier having a first input node coupled to the output node of said first operational transconductance amplifier, and an output node coupled to both a second input node of said second operational transconductance amplifier and a second input node of said first operational transconductance amplifier, and having said second control signal applied thereto for controlling the transconductance thereof;
a first capacitor coupled between the output node of said first operational transconductance amplifier and ground; and
a second capacitor coupled between the output node of said second operational transconductance amplifier and ground.

7. An RGB encoder as claimed in claim 6, wherein each of said first and second operational transconductance amplifiers comprises:
a differential amplifier having a common emitter and an output node;
a first dependent current source coupled between said common emitter of said differential amplifier and ground, whose current is varied in accordance with said second control signal; and
a second dependent current source having one end coupled to a power supply and the other end coupled to said output node, whose current is half that of said first dependent current source.

8. An RGB encoder as claimed in claim 5, wherein said first and second trap filters each comprises:
a first operational transconductance amplifier for receiving the output of said low-pass filter, and having said second control signal applied thereto for controlling the transconductance thereof;
a second operational transconductance amplifier having a first input node coupled to the output node of said first operational transconductance amplifier, and an output node coupled to both the second input node of said first operational transconductance amplifier and a second input node coupled to the second input node of said first operational transconductance amplifier, and having said second control signal applied thereto for controlling the transconductance thereof;
a first capacitor coupled between the output node of said second operational transconductance amplifier and a first input node of said first operational transconductance amplifier; and a second capacitor coupled between the output node of said first operational transconductance amplifier and ground.

9. An RGB encoder as claimed in claim 8, wherein each of said first operational transconductance amplifier and second operational transconductance comprises:
   a differential amplifier circuit having a common emitter and an output node;
   a first dependent current source coupled between said common emitter of said differential amplifier circuit and ground, whose current is varied in accordance with the second control signal; and
   a second dependent current source having one end coupled to a power supply and the other end coupled to said output node, whose current is half that of said first dependent current source.

10. An RGB encoder as claimed in claim 1, wherein said control signal generator comprises:
   a first level selector for producing said first control signal whose voltage level is selected between two predetermined levels in accordance with said NTSC/PAL select signal; and
   a second level selector for producing said second control signal whose voltage level is selected between another two predetermined levels in accordance with said NTSC/PAL select signal.

* * * * *